his invention relates to an electronic control system for controlling a D.-C. motor, and particularly to a system wherein the speed range of the motor can be controlled by the relationship between the field and armature voltages.

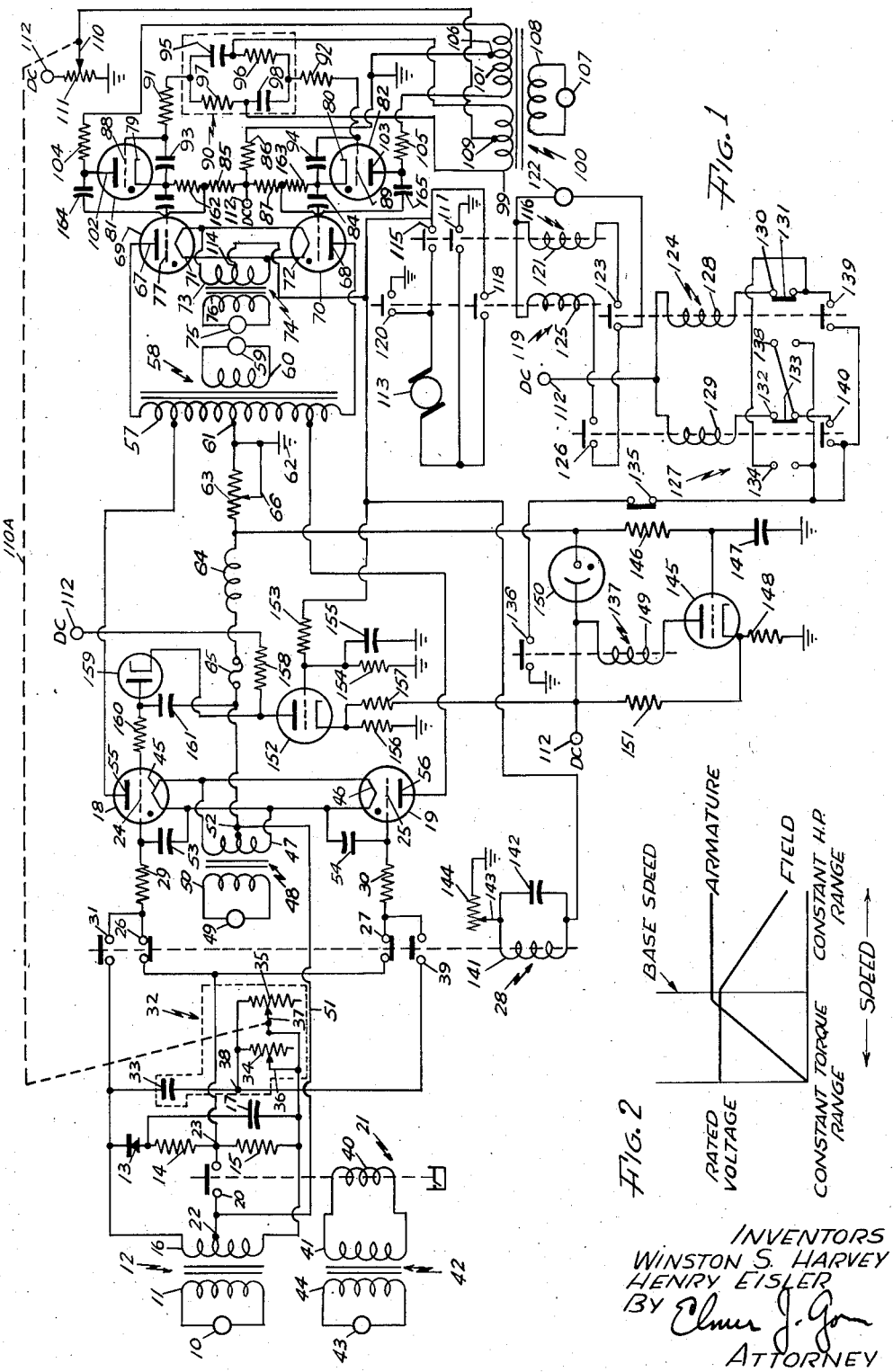

2,802,977

ELECTRONIC CONTROL SYSTEM FOR A D.-C. MOTOR

Winston S. Harvey, Bedford, and Henry Eisler, Brighton, Mass., assignors to Raytheon Manufacturing Company, Waltham, Mass., a corporation of Delaware Application February 28, 1956, Serial No. 568,353

7 Claims. (Cl. 318—338)

This invention relates to an electronic control system for controlling a D.-C. motor, and particularly to a system wherein the speed range of the motor can be controlled by the relationship between the field and armature voltages.

Certain D.-C. motors are capable of operating over a wide range of speeds by controlling the relationship between the shunt field and armature voltages. Such D.-C. motors are usually energized initially by the application of the rated value of shunt field voltage while the armature voltage is increased to its rated value to attain increasing speeds. Thereafter, the armature voltage is maintained at its rated value while the shunt field voltage is decreased to attain increasing speeds.

The range of speeds characterized by developing the rated shunt field voltage and an increasing armature voltage is commonly referred to as the constant torque range of the particular motor. The range of speeds characterized by developing the rated armature voltage and a decreasing shunt field voltage is commonly referred to as the constant horsepower range.

Pursuant to this invention, a pair of arc-type thyratrons is employed to develop the rated field voltage over the constant torque range of speeds. Similarly, a pair of arc-type thyratrons is employed to develop the rated armature voltage over the constant horsepower range of speeds. However, since the armature voltage is of lesser values than its rated value in the constant torque range of speeds and the field voltage is of lesser values than its rated value in the constant horsepower range of speeds, it is desirable to have the thyratrons supplying these voltages regulated by the adjustment of a single control, the speed control, in order to obtain smooth transition from one speed range to another.

The speed control is a dual potentiometer which controls the values of armature and field voltage that can be developed. In the constant torque range, armature voltages less than the rated value are developed. In this range of speeds, the shunt field voltage developed remains constant at the rated value. However, when the speed control is advanced and the D.-C. motor is to be operated at speeds in the constant horsepower range, it is necessary to decrease the value of shunt field voltage developed in order to attain such speeds. A phase-shift circuit is employed to delay the firing of one of the thyratrons developing said shunt field voltage. Said phase-shift circuit becomes operative to delay the firing of one of said thyratrons substantially in the vicinity of the constant horsepower range of speed. The phase-shift circuit includes a capacitor and variable resistor connected in series with each other and connected across a center-tapped alternating current supply that makes a grid of each thyratron positive when the corresponding anode is positive, thus causing one thyratron to fire on each half cycle. However, in the constant horsepower range, the lagging phase-shifted voltage is coupled to the grid of one thyratron. Said thyratron fires only over a portion of its conductive half cycle while the other fires normally. In this manner, the generated shunt field voltage is maintained at a value commensurate with the speed selected for the motor. Smooth transition from one range of speeds to another is accomplished by selecting particular characteristics for the two-ganged potentiometers comprising the speed control. The armature control section of the speed control is selected so that for a first sector of rotation, the constant torque range, its resistance increases, causing substantially more armature voltage to be developed. Substantially at the end of this first sector, the rated value of armature voltage is generated, but any further rotation of said control does not result in any appreciable change of resistance and the armature voltage remains at the rated value. The field control section of the speed control which forms part of the variable resistance of the phase-shift circuit has operating characteristics opposite to those of the armature control section. Over the first sector of rotation by the speed control, no appreciable change of resistance occurs and the firing time of one of said thyratrons is not affected. Substantially at the end of the first sector and thereafter, the value of the resistance in the phase-shift circuit increases, causing one of the thyratrons to fire later with increasing speed settings of the speed control. In this manner, smooth transition from one range of speed to another is attained.

Heretofore, saturable reactors and associated circuitry for developing the required D.-C. voltages for operating same have been employed to limit the conduction of one or both thyratrons generating the shunt field voltage. The use of such devices requires more intricate circuitry and necessarily raises the expenditures for developing an electronic control system as described herein. In the present invention, the use of these reactor devices has been obviated by the simple arrangement of the phase-shift circuit in conjunction with the armature control.

Another feature of the present invention is the use of a sensing circuit to monitor the instantaneous magnitude of the armature voltage in order to limit the magnitude of the shunt field voltage when the former voltage would be excessive. This sensing circuit is the armature overvoltage circuit. It prevents damage to the armature commutators and brushes during periods when the speed of the motor is changed substantially. Said circuit biases the grid of the normally conducting thyratron of the shunt field generator below or substantially near the critical voltage required to fire said tube, whenever the armature voltage would be excessive. Saturable reactors have heretofore been employed to perform this monitoring function. The reasons advanced previously for eliminating the use of such devices apply equally well in considering the merit of the invention in accomplishing this objective.

Provision is also made for preventing the motor from being energized or for deenergizing the motor once it has been energized if for any reason the shunt field voltage is below a predetermined minimum value.

The aforementioned and other aspects of the invention will be understood more clearly from the following description of exemplifications thereof with reference being made to the accompanying drawing, wherein:

Fig. 1 is a schematic diagram of an embodiment of the invention for controlling the speed of a D.-C. motor; and Fig. 2 is a graphical representation of the values of shunt field and armature voltage for the speed ranges of the motor.

As illustrated in Fig. 1, an alternating current supply 10 is connected across a primary winding 11 of an iron-core transformer 12. A crystal diode 13 in series with resistors 14 and 15, across a secondary winding 16 of the transformer 12, and a capacitor 17, shunt connected across the resistors 14 and 15, form a biasing circuit for a pair of arc-type discharge tubes 18 and 19. A pair of normally-open contacts 20 of a time delay relay 21 is connected between a center tap 22 of the secondary winding 16 and a junction 23 of the resistors 14 and 15. The junction 23 is connected to a grid 24 or 25 of the tubes 18 and 19 through a pair of normally-closed contacts 26 or 27 of a speed-sensitive relay 28 and a current-limiting resistor 29 or 30. A pair of normally-open contacts 31 of the relay 28 has one contact attached to the junction of the secondary winding 16 and the cathode of the diode 13 and the other contact thereof attached to the input side of the resistor 29. A phase-shift circuit 32 comprised of a capacitor 33 and the parallel arrangement of potentiometers 34 and 35 is connected across the secondary winding 16 of the transformer 12. Wiper arms 36 and 37 of the potentiometers are attached to the junction of the secondary winding 16 and the resistor 15. The potentiometer 37 has special characteristics which are described subsequently. A junction 38 of one side of the capacitor 33 and one side of the potentiometers 34 and 35 is attached to a contact of a normally-open pair of contacts 39 of the relay 28. The other contact of the contacts 39 is attached to the input side of the resistor 30. A solenoid 40 of the relay 21 is attached to a secondary winding 41 of an iron-core transformer 42. An alternating current supply 43 is connected across a primary winding 44 of the transformer 42.

Cathodes 45 and 46 of the tubes 18 and 19 are connected together. A secondary winding 47 of an iron-core transformer 48 may be connected across the cathodes for heating purposes. An alternating current supply 49 is connected across a primary winding 50 of the transformer 48. A lead 51 is connected between a center tap 52 of the transformer 48 and the center tap 22 of the secondary winding 12. A filter capacitor 53 or 54 is connected between the grid 24 or 25 and the cathode 45 or 46. An anode 55 or 56 of the tubes 18 and 19 is attached to opposite ends of a center-tapped secondary winding 57 of an iron-core transformer 58. An alternating current supply 59 energizes a primary winding 60 of the transformer 58. A center tap 61 is connected to a common ground 62. Current flowing between the cathodes 45 and 46 and the common ground flows through a variable resistor 63, a shunt field 64 of the motor employed, and a fuse 65. A slider 66 of the variable resistor 63 is connected to the common ground. The fuse 65 is connected to the center taps 52 and 22 of the transformers 48 and 12, respectively.

Anodes 67 and 68 of another pair of arc-type discharge tubes 69 and 70 are also connected to opposite ends of the center-tapped secondary winding 57. Cathodes 71 and 72 of said tubes 69 and 70 are connected together. A secondary winding 73 of an iron-core transformer 74 is connected across the cathodes 71 and 72. An alternating current supply 75 energizes a primary winding 76 of the transformer 74. Grids 77 and 78 of said tubes 69 and 70 are individually connected to cathodes 79 and 80 of another pair of arc-type discharge tubes 81 and 82 through capacitors 83 and 84. The tubes 81 and 82 develop positive trigger pulses which are coupled to the grids 77 and 78 and control the firing time of the tubes 69 and 70. The cathode 79 is connected to the common ground through resistors 162, 85, and 86. The cathode 80 is connected to the common ground through resistors 163, 87, and 86 in series. The junction of the resistors 85, 86, and 87 is connected to the direct current supply for biasing said cathodes 79 and 80. Grids 88 and 89 are connected to opposite ends of a phase-shift circuit 90 through resistors 91 and 92. Filter capacitors 93 and 94 are connected between the grids 88 and 89 and the cathodes 79 and 80. The phase-shift circuit 90 has two parallel legs. One leg is comprised of a capacitor 95 in series with a resistor 96. The other leg is comprised of a resistor 97 in series with a capacitor 98. The grid resistor 91 is attached to the junction of the capacitor 95 and the resistor 97. The grid resistor 92 is attached to the junction of the resistor 96 and the capacitor 98. A secondary winding 99 of an iron-core transformer 100 is connected across the junction of the resistor 97 and the capacitor 98 and the junction of the capacitor 95 and the resistor 96 for energizing the grids 88 and 89 180 degrees out of phase. The opposite ends of another secondary winding 101 of the transformer 100 are connected individually to the anodes 102 and 103 through resistors 104 and 105. A capacitor 164 is connected between the anode 102 and the junction of the resistors 162 and 85. A capacitor 165 is connected between the anode 103 and the junction of resistors 163 and 87. A center tap 106 of the secondary winding 101 is connected to the common ground. An alternating current supply 107 is connected across a primary winding 108 of the transformer 100. A center tap 109 of the secondary winding 99 is connected to the wiper arm 110 of a potentiometer 111. A positive D. C. supply 112 is connected to one end of the potentiometer 111 while the other end of the potentiometer is connected to the common ground. The wiper arm 110 of said potentiometer, which is the armature section of the speed control, determines the firing angle of the tubes 81 and 82 and consequently the firing angle of the tubes 69 and 70. The potentiometers 35 and 111 may be tapered or logarithmic-type resistances. The potentiometers 35 and 111 are connected into their respective circuits with the wiper arms 37 and 110 ganged, as shown by line 110A, and the resistance of the potentiometer 111 increasing over the first sector of rotation while the resistance of the potentiometer 35 remains negligible. Over the second sector of rotation the resistance of the potentiometer 35 should increase as the resistance of the potentiometer 111 remains constant.

Current flowing between the cathodes 71 and 72 and the grounded center tap 61 of the secondary winding 57 flows through an armature 113 of the motor employed. Provision is made for rotating the armature in the forward and reverse directions. In the forward direction the armature has one end thereof connected to a center tap 114 of the secondary winding 73 through a pair of normally-open contacts 115 of a forward contactor 116. The other end of the armature is connected to the common ground through another pair of normally-open contacts 117 of the forward contactor 116. In the reverse direction the armature has one end thereof connected to the center tap 114 through a pair of normally-open contacts 118 of a reverse contactor 119. The other end of the armature is connected to the common ground through another pair of normally-open contacts 120 of the reverse contactor 119. In this manner, the output of the tubes 69 and 70 can be switched across the armature.

A solenoid 121 of the forward contactor 116 is energized by an alternating current supply 122 when a pair of normally-open contacts 123 of a forward relay 124 closes. A solenoid 125 of the reverse contactor 119 is also energized by the alternating current supply 122 when a pair of normally-open contacts 126 of a reverse relay 127 closes. A solenoid 128 of the forward relay 124 has one end thereof connected to the positive D.-C. supply 112. Similarly, a solenoid 129 of the reverse relay 127 has one end thereof connected to the positive D.-C. supply 112. The other end of the solenoid 128 is connected to a normally-closed pair of contacts 130 of a reverse push button 131. Similarly, the other end of the solenoid 129 is connected to a normally-closed pair of contacts 132 of a forward push button 133. The forward and reverse push buttons are depressed to energize the corresponding relay, which in turn energizes the corresponding contactor, which causes the output of the tubes 69 or 70 to be applied across the appropriate terminals of the armature. Depressing the forward push button 133 closes a pair of normally-open contacts 134 providing a path to ground through a pair of normally-closed contacts 135 of a stop button in series to the common ground with a pair of normally-open contacts 136 of a field-loss protection relay 137. The function of the field-loss protection relay and the circuit energizing same will be described subsequently. At this point, it need only be noted that the forward relay 124 and the reverse relay 127 cannot be energized until the contacts 136 close. Similarly, depressing the reverse push button 131 closes a pair of normally-open contacts 138 providing a path to the common ground through the stop button 135 and the contacts 136. One contact of the contacts 130 is connected to one contact of the stop button 135 when a pair of normally-open contacts 139 of the forward relay 124 closes. Similarly, one contact of the contacts 132 is connected to one contact of the stop button 136 when a pair of normally-open contacts 140 of the reverse relay 127 closes. With this arrangement, once the forward or reverse relay is energized by depressing the particular push button, the relay remains energized after the push button is released and until the stop button is depressed.

A portion of the armature voltage developed is coupled to one side of the parallel circuit comprised of a solenoid 141 of the relay 28 and a filter capacitor 142. The other side of the parallel circuit is connected to the common ground through a wiper arm 143 of a potentiometer 144. The setting of the wiper arm 143 determines the value of armature voltage at which the relay 28 becomes energized.

A field-loss protection circuit is employed to prevent the motor from being energized until a sufficient amount of shunt field voltage is developed and to deenergize the motor once it has been energized if the shunt field voltage decreases below a minimum value. A portion of the shunt field voltage developed across the variable resistor 63 is coupled to the grid of an electron discharge valve 145 across a resistor 146. The setting of the slider 66 determines the minimum amount of shunt field voltage required to keep the relay 137 energized. A filter capacitor 147 is connected between the grid of the valve 145 and the common ground. A cathode of said valve is connected to the common ground through a load resistor 148. An anode of said valve has as its load a solenoid 149 of the field-loss protection relay 137. A gaseous voltage regulator 150, having an anode connected between one end of the solenoid 149 and the direct current supply 112 and a cathode connected to the input to the grid of the valve 145, maintains the anode of the valve 145 at positive 150 volts with respect to said grid. A resistor 151, connected between the positive 150 volt supply and the cathode of said valve 145, forms a voltage divider to ground with the resistor 148 in the cathode circuit.

An armature over-voltage circuit is employed to limit the shunt field voltage during periods when the armature voltage would be excessive. A portion of the armature voltage developed at the center tap 114 is coupled to the grid of an electron discharge valve 152 across a voltage divider comprised of a resistor 153 in series to ground with a resistor 154. The voltage coupled to the grid is developed across the resistor 154. A filter capacitor 155 is connected across the resistor 154. A cathode of said valve 152 is conneced to the common ground through a load resistor 156. The resistor 156, in series with a resistor 157 connected to the positive 150 volt supply, forms a voltage divider for biasing said cathode. An anode of said valve 152 is connected to the positive D.-C. supply 112 through a resistor 158. The anode is also connected to a cathode of an electron discharge valve 159. An anode of the valve 159 is connected to the grid 24 of the tube 18 through a load resistor 160. A capacitor 161 is connected between the anode of said valve 159 and the center tap 52 of the secondary winding 47.

The tubes 18 and 19 are normally nonconducting to allow the heating of the filament circuits prior to the shunt field voltages. The biasing circuit comprised of the diode 13, the resistors 14 and 15, and capacitor 17 maintains the grid voltages of the tubes 18 and 19 below the critical voltage necessary to fire said tubes until the contacts 20 of the time delay relay 21 close. For the purpose of explanation, assume that the anode 55 is made negative for a half cycle while the anode 56 is made positive by the connection to the secondary winding 57. Also assume that the secondary winding 16 is in phase with the secondary winding 57 so that the cathode of the diode 13 is negative. The diode will pass current during this half cycle and the current flowing through resistors 14 and 15 will charge the side of the resistor 15 attached to the junction 23 negative. Since the resistor 15 is, in effect, connected between the cathodes and the grids of the tubes 18 and 19, the grid 25 will be connected to this negative potential through the closed contacts 27 and the resistor 30. Thus, when the anode 56 is positive, the tube 19 will not fire. On the next half cycle, the anode 55 and the cathode of the diode 13 will be positive. The diode will not conduct on this half cycle but the capacitor 17 will tend to discharge through the resistors 14 and 15 and keep the side of the resistor 15 connected to the junction 23 negative. The grid 24 is connected to this negative potential through the closed contacts 26 and the resistor 29. Thus, when the anode 45 is positive, the tube 18 will not fire. The capacitor 17 maintains the biasing voltage more nearly like pure D.-C. by charging toward the applied voltage across the secondary winding 16 and by discharging only slightly through the resistors 14 and 15 when the diode 13 is nonconducting. The time delay relay 21 is energized after the elapse of a few minutes. After the contacts 20 close, current ceases to flow through the resistor 15 so that the grid and cathode are at the same potential. Thus, very soon after the anode 55 or 56 starts to become positive the tube 18 or 19 fires. Current flowing from the cathode 45 or 46 to the center tap 61 develops the shunt field voltage in the shunt field 64. The fuse 65 is a protective device between the shunt field and the return path to the cathodes at the center tap 52. The connection between the center taps 52 and 22 keeps the grid-to-cathode potential constant with variations of the shunt field voltage. With the proper selection of circuit components and voltages, the tubes 18 and 19 can furnish the rated value of shunt field voltage for the D.-C. motor employed, and the motor can be energized with the rated shunt field voltage applied and only a small armature voltage. This is a desirable starting condition since large currents are not developed in the armature of the motor.

The field-loss protection circuit monitors the shunt field voltage developed. Any time the value falls below a minimum value, the protection circuit prevents the motor from being energized initially or deenergizes the motor after it has been energized. The theory of operation of said protection circuit is given in a subsequent paragraph.

The tubes 69 and 70 develop the voltage for the armature 113. The tubes 69 and 70 are fired by positive pulses developed at the cathodes 79 and 80 of the tubes 81 and 82 and fed to the grids 77 and 78 during the half cycle that the anodes 67 and 68 are positive. The positive pulses are generated in the following manner. The tubes 81 and 82 are biased to cutoff when the wiper arm 110, the armature control, is set to zero speed due to the bias developed across the resistor 86. The anodes 102 and 103 of the tubes 81 and 82 are energized 180 degrees out of phase with respect to each other by the connection to the opposite ends of the secondary winding 101. Similarly, the grids 88 and 89 are energized 180 degrees out of phase with respect to each other by the connection of the secondary winding 99 to the junction of the resistor 97 and the capacitor 98 and the junction of the capacitor 95 and the resistor 96. However, the A.-C. voltages applied to the grids 88 and 89 are phase shifted by 90 degrees by the phase-shift circuit so that said grid voltages lag said anode voltages by 90 degrees. In addition, the setting of the wiper arm 110, the armature control, supplies a positive D.-C. voltage to the grids 88 and 89. The magnitude of the D.-C. voltage controls the period during the half cycle when the anodes 102 and 103 are positive that the grid voltages will exceed the critical voltages necessary to fire the tubes 81 and 82. The minimum value of D.-C. voltage that can be coupled to said grids 88 and 89 is adjusted so that the tubes 81 and 82 fire late in the positive half cycle of the anodes. The maximum value of the D.-C. voltage that can be coupled to said grids 88 and 89 is adjusted so that the tubes 81 and 82 fire early in the positive half cycle of the anodes. When the tubes fire, the capacitors 164 and 165 discharge through said tubes and develop positive pulses across the resistors 162 and 163. These pulses are coupled across the capacitors 83 and 84 to the grids 77 and 78. The circuit components and voltages employed for triggering the tubes 81 and 82 have been adjusted so that the positive pulses developed at the maximum D.-C. voltage setting of the armature control will cause the rated value of armature voltage to be developed.

The tubes 69 and 70 develop the voltage for the armature 113. The anodes 67 and 68 are energized 180 degrees out of phase by their connection to the center-tapped secondary winding 57. The tubes 69 and 70 are fired every half cycle, when said anodes are positive, by the positive pulses fed to the grids 77 and 78. Since the anodes 67 and 68 are in phase with the anodes 102 and 103 of the tubes 81 and 82, said tubes 69 and 70 are fired relatively at the same portion of the positive anode half cycle as said tubes 81 and 82. It follows then that the setting of the speed control, the wiper arm 110, determines the firing time of the tubes 69 and 70, and thus the amount of armature voltage developed. With the particular D.-C. motor employed herein, in the constant torque range of speeds the armature voltage is an increasing value with speed. In the constant horsepower range of speeds, the armature voltage remains constant at the rated value. Thus, the positive pulses fed to the tubes 69 and 70 are adjusted to arrive earlier in time with increased speed settings until the rated armature voltage is developed.

Current flowing from the cathodes 71 and 72 on alternate half cycles to the center-tapped secondary winding 57 of the transformer 53 provides the voltage for the armature 113. A pair of contactors energized by a pair of relays provides a means for energizing the armature in the forward or reverse directions. In the forward direction, a path to the common ground from the center tap 114 through one end of the armature is provided when the contacts 115 and 117 of the forward contactor 116 close. In the reverse direction, the center tap 114 is grounded through the other side of the armature through the contacts 118 and 120 of the reverse contactor 119. The solenoids 121 and 125 of the forward and reverse contactors are energized individually by the forward and reverse relays 124 and 127. Said relays are energized in the following manner and for the purpose of the explanation assume the contacts 136 of the relay 137 are closed. The forward relay 124 is energized when the push button 133 is depressed. A path to ground for the positive D.-C. supply 112 through the solenoid 128 of said relay is provided through the push button 131, the contacts 134, the stop button 135, and the contacts 136. The contacts 139 also close, allowing the relay 124 to remain energized after the push button 133 is released. The forward contactor 116 is energized by the closing of the contacts 123 which closes the circuit between the alternating current supply 122 and the solenoid 121 of said contactor. When the forward contactor 116 is energized, the contacts 115 and 117, in series with the armature 113 to the common ground, close, causing the armature to be rotated in the forward direction. A similar closing of contacts occurs when the reverse relay 127 is energized by depressing the push button 131. One end of the solenoid 129 of said relay is grounded and the contacts 140 and 126 close. The closing of the contacts 140 allows the push button 131 to be released without deenergizing the relay. The closing of the contacts 126 results in energizing the reverse contactor 119 by closing the circuit of the alternating supply 122 through the solenoid 125. When the reverse contactor is energized, the armature is connected to the common ground through the closed contacts 118 and 120.

As mentioned previously, the wiper arms 110 and 37 of the potentiometers 111 and 35 are ganged and said potentiometers are tapered or have logarithmic resistance functions. Let us assume once more that the contacts 136 are closed and that we are desirous of energizing the armature in the forward direction.

The push button 133 is depressed and the wiper arm 111, the speed control, is set for some low speed. After the delay imposed by the time delay relay 21, the rated shunt field voltage is applied to the shunt field 64. The setting of the speed control has provided the grids 88 and 89 of the tubes 81 and 82 with a small positive voltage so that there is considerable delay in the firing of said tubes on alternate half cycles. Fig. 2 illustrates the relationship between shunt field voltage and armature voltage for various speeds. As a result of this delay, the armature voltage developed by the tubes 69 and 70 will be a small value and the low speed selected will result. As the speed control is advanced, the tubes 81 and 82 and 69 and 70 fire earlier so that the armature voltage and the motor speed are increasing.

As mentioned earlier, the tubes 69 and 70 develop the rated armature voltage at the setting of the wiper arm 110 which couples the most positive voltage to the tubes 81 and 82. The speed characterized by the development of the rated shunt field and armature voltages is referred to as the base speed. In the vicinity of the base speed, it is desirable to energize the speed-sensitive relay 28 to open the contacts 26 and 27 and to close the contacts 31 and 39, and to have any further rotation of the wiper arm 110 causes the resistance of the potentiometer 35 to increase as the resistance of potentiometer 111 remains substantially constant. These new conditions will enable the motor to develop speeds in the constant horsepower range. The constant horsepower range is characterized by speeds resulting from the rated armature voltage and decreasing shunt field voltages. With the particular characteristics chosen for potentiometer 111, any further rotation of the speed control, the wiper arm 110, will not result in any change of resistance of said potentiometer, so that the rated armature voltage will be developed. However, the resistance of potentiometer 35 will increase as the speed control is advanced for increasing speeds since the wiper arms 110 and 37 are ganged.

The relay 28 is energized substantially near the base speed of the motor. The wiper arm 143 of the potentiometer 144 is preset to have this condition occur. The filter capacitor 142, connected in shunt with the solenoid 141 of the relay, smooths A.-C. components of the armature voltage coupled to said solenoid. When the contacts 31 close, the grid 24 of the tube 18 is connected to one side of the secondary winding 16. When the contacts 39 close, the grid 25 of the tube 19 is connected to the junction 38 of the phase-shift circuit. The tube 18 fires normally over each half cycle when the grid 24 and the anode 55 are positive. The firing of the tube 19 is delayed, said delay being dependent upon the phase shift induced by increasing the resistance of potentiometer 35 in the phase-shift circuit. The setting of the wiper arm 36 of the potentiometer 34, connected in parallel with the potentiometer 35, adjusts the maximum resistance of the parallel circuit, and thus determines the maximum phase shift that can be obtained by rotation of the wiper arm 37 of the potentiometer 35. The particular arrangement of components comprising the phase-shift circuit are such as to enable the voltage applied to the grid 25 to be delayed almost 180 degrees. Let us assume that the speed control, the wiper arm 110, has been advanced to a position which causes the voltage applied to the grid 25 to be delayed 45 degrees. The tube 18 fires normally when its grid and anode are positive, but since the firing of the tube 18 is delayed by 45 degrees and the shunt field 64 is a highly inductive load, the tube 18 continues to conduct after its anode has ceased to be positive and is becoming negative. When the alternating voltage supplied to the anode 55 of the tube 18 starts to become negative, the induced voltage in the field maintains the same anode-to-cathode polarity and the tube 18 continues to conduct until the anode potential is more negative than the cathode. A substantially larger ratio of inductance to D.-C. resistance of the inductive load enables shunt field current to flow uninterrupted until the tube 19 fires. After the 45 degree delay, tube 19 fires and shunt field current flows during the remainder of the period during which the anode 56 is positive and for only a short period thereafter, due to the collapsing field, before the tube 18 takes over again. By controlling the firing of tube 19 and allowing tube 18 to fire normally, the average shunt field voltage generated over successive cycles controls the speed of the motor in the constant horsepower range. Fig. 2 illustrates the relationship between the rated armature voltage and shunt field voltage for speeds in this range.

The operation of the D.-C. motor necessarily requires changes of speed commensurate with the use of the motor. If the motor is operating at a high speed in the constant horsepower range, and the speed control is turned down for a substantially lower speed, the tubes 18 and 19 would tend to develop a higher or the rated shunt field voltage. If the shunt field voltage was developed immediately for the new setting of the speed control, the armature voltage would be excessive, and damage to the commutator could result. The D.-C. motor, during transition periods of this nature, acts like a generator, rather than a motor, since its speed cannot change immediately and respond to the new speed selected. The armature over-voltage protection circuit maintains the shunt field voltage at a small value until the speed of the motor decreases.

A portion of the armature voltage at the center tap 114 of the secondary winding 73 is coupled to the grid of the valve 152 across resistors 153 and 154. The capacitor 155 smooths the voltage across the resistor 154. If the armature voltage is of sufficient magnitude, the bias voltage applied to the cathode is overcome and said valve conducts. Let us assume that the armature voltage is of sufficient magnitude and that this is an instance for regulating the amount of shunt field voltage. When the valve 152 conducts, its anode and the cathode of the diode 159 become less positive. The anode of the diode 159 tends to become more positive since it is attached to the grid 24 and the tubes 18 and 19 are tending to generate a higher shunt field voltage because the speed control has been positioned for a slower speed. As soon as the anode of the diode 159 becomes more positive than the cathode, current flows from said cathode, through the resistors 160 and 29, the contacts 131, and to the common ground. The flow of current biases the grid 24 at some level commensurate with the instantaneous relationship between the armature and shunt field voltages. As a result, the tube 18 may not fire at all over its normally conducting half cycle or only over a portion thereof. The capacitor 161 lends stability to the protection offered by the over-voltage circuit. The bias developed at the grid 24 is required when the anode 55 and the grid 24 are becoming positive. However, on the next half cycle the grid 24 is made negative and this potential would very likely cause the diode 159 to stop conducting. Thus, on the succeeding positive cycle, there would be no bias available at said grid 24, and the tube 18 would fire uncontrolled and defeat the purpose of the circuit. The side of capacitor 161 connected to the anode of the diode 159 charges negatively when said diode conducts, and when the diode stops conducting, it discharges through the resistors 160 and 29 to the common ground. In this way, the bias is kept at the grid 24 until the armature voltage returns to within limits. Thereafter, the required shunt field voltage is developed for the particular speed selected.

The field-loss protection circuit monitors the shunt field voltage for the reasons mentioned previously. A portion of the shunt field voltage developed across the variable resistor 63 is coupled to the grid of the valve 145 across the resistor 146. The capacitor 147 smooths the A.-C. component of the applied voltage. Since said valve 145 is normally cut off by the bias voltage applied to the cathode, the contacts 136 are normally open and the armature circuit cannot be energized, as explained earlier in the description of that circuit. However, if the magnitude of the input to the grid of the valve 145 is sufficient to overcome the bias, the current flowing through the solenoid 149 causes the contacts 136 to close and the armature circuit can be energized. This protection circuit is also effective in deenergizing the armature circuit once it has been energized, if for any reason the shunt field voltage falls below the value required to keep the relay 137 energized.

The invention has disclosed a device for energizing a D.-C. motor over speed ranges where the rated shunt field voltage and varying armature voltages are required and where the rated armature voltage and varying shunt field voltages are required. In addition, a protective armature over-voltage circuit has been included which uniquely utilizes the grid of one of the tubes that develops the shunt field voltage to decrease the value of the shunt field voltage when the armature voltage might be excessive. Another protective circuit prevents the armature voltage from being supplied, if for any reason the shunt field voltage falls below a certain minimum value.

It is desired that the principles disclosed with the particular embodiment described herein not be restricted to details of assembly and particular components, since many equivalents will suggest themselves to those skilled in the art. It is accordingly desired that the appended claims be given a broad interpretation commensurate with the scope of the invention within the art.

What is claimed is:

1. An electronic control system for a D.-C. motor comprising electronic means for generating the rated value of D.-C. voltage for a field winding of a D.-C. motor, electronic means for generating the rated value D.-C. voltage for an armature winding of a D.-C. motor, sensing means connected between said field voltage generating means and said armature voltage generating means for interrupting the voltage coupled to an armature winding whenever the magnitude of the field voltage is below a predetermined value, regulating means connected between said field and armature voltage generating means for causing less than the rated value of armature voltage to be generated over a first range of speeds of a D.-C. motor and for causing less than the rated value of field voltage to be generated over a second range of speeds of a D.-C. motor, and means connected between said field voltage generating means and said armature voltage generating means for biasing said field voltage generating means only partially conducting whenever the magnitude of the armature voltage would be excessive for the magnitude of the field voltage developed.

2. An electronic control system for a D.-C. motor comprising electronic means for generating the rated value of pulsating D.-C. voltage for a field winding of a D.-C. motor including a regulating device for causing less than the rated value to be generated, electronic means for generating the rated value of pulsating D.-C. voltage for an armature winding of a D.-C. motor including a regulating device for causing less than the rated value to be generated, energizing means connected to said regulating means for causing less than the rated value of armature voltage to be generated over a first range of speeds of a D.-C. motor and for causing less than the rated value of field voltage to be generated over a second range of speeds of a D.-C. motor, sensing means connected between said field voltage generating means and said armature voltage generating means for interrupting the voltage coupled to an armature winding whenever the magnitude of the field voltage is below a predetermined value, and means connected between said field voltage generating means and said armature voltage generating means for biasing said field voltage generating means only partially conducting whenever the magnitude of the armature voltage would be excessive for the magnitude of the field voltage developed.

3. An electronic control system for a D.-C. motor comprising electronic means for generating pulsating D.-C. voltage for a field winding of a D.-C. motor, electronic means for generating pulsating D.-C. voltage for an armature winding of a D.-C. motor, sensing means connected to the output of said field voltage generating means and to said armature voltage generating means for opening a pair of contacts in the output circuit of said armature voltage generating means whenever the magnitude of the field voltage is below a predetermined value, regulating means connected between said field and armature voltage generating means for causing less than the rated value of armature voltage to be generated over a first range of speeds of a D.-C. motor and for causing less than the rated value of field voltage to be generated over a second range of speeds of a D.-C. motor, and means connected between said field voltage generating means and said armature voltage generating means for biasing said field voltage generating means only partially conducting whenever the magnitude of the armature voltage would be excessive for the magnitude of the field voltage developed.

4. An electronic control system for a D.-C. motor comprising means for generating D.-C. voltage for a field winding of a D.-C. motor including a first and a second arc-type thyratron each having a cathode, a grid, and an anode and connected as a full-wave rectifier, means for generating pulsating D.-C. voltage for an armature winding of a D.-C. motor, sensing means connected to the output of said field voltage generating means and to said armature voltage generating means for opening a pair of contacts in the output circuit of said armature voltage generating means whenever the magnitude of the field voltage is below a predetermined value, regulating means connected between said field and armature voltage generating means for causing less than the rated value of armature voltage to be generated over a first range of speeds of a D.-C. motor and for causing less than the rated value of field voltage to be generated over a second range of speeds of a D.-C. motor, and means connected between a grid of one of said first and second thyratrons of said field voltage generating means and said armature voltage generating means for biasing said one of said first and second thyratrons non conducting or only partially conducting whenever the magnitude of the armature voltage would be excessive for the magnitude of the field voltage developed.

5. An electronic control system for a D.-C. motor comprising means for generating D.-C. voltage for a field winding of a D.-C. motor including a first and a second arc-type thyratron each having a cathode, a grid, and an anode and connected as a full wave rectifier, means for generating pulsating D. C. voltage for an armature winding of a D.-C. motor, phase-shifting means connected to the grid of one of said first and second thyratrons for relaying the firing of said one of said thyratrons, regulating means connected between said phase-shifting means and said armature voltage generating means for causing less than the rated value of armature voltage to be generated when the rated value of field voltage is being generated and for energizing said phase-shifting means when the rated value of armature voltage is being generated, sensing means connected to the output of said field voltage generating means and to said armature voltage generating means for opening a pair of contacts in the output circuit of said armature voltage generating means whenever the magnitude of the field voltage is below a predetermined value, and means connected between the grid of another of said first and second thyratrons and the output of said armature voltage generating means for biasing said grid below or substantially near the critical firing voltage of said first or second thyratron whenever the magnitude of the armature voltage would be excessive for the magnitude of the field voltage developed.

6. An electronic control system for a D.-C. motor comprising electronic means for generating D.-C. voltage for a field winding of a D.-C. motor, means for generating D.-C. voltage for an armature winding of a D.-C. motor including a first and a second thyratron each having a cathode, a grid, and an anode and connected as a full wave rectifier, sensing means connected to the output of said field voltage generating means and to said armature voltage generating means for opening a pair of contacts in the output circuit of said armature voltage generating means whenever the magnitude of the field voltage is below a predetermined value, trigger means connected to the grids of said first and second thyratrons for energizing said thyratrons, means connected to said trigger means and to said field voltage generating means for energizing said trigger means substantially early in the positive half cycle of said anodes when the field voltage is less than the rated value and to energize said trigger mean substantially later in the positive half cycle of said anodes when the rated value of field voltage is being generated, and means connected between said field voltage generating means and the output circuit of said armature voltage generating means for biasing said field voltage generating means only partially conducting whenever the magnitude of the armature voltage would be excessive for the magnitude of the field voltage developed.

7. An electronic control system for a D.-C. motor comprising means for generating the rated value of D.-C. voltage for a field winding including a first and a second thyratron each having a cathode, a grid, and an anode, means for energizing the anodes of said first and second thyratrons 180 degrees out of phase with respect to each other, means for generating the rated value of D.-C. voltage for an armature winding including a first and a second thyratron each having a cathode, a grid, and an anode, means for energizing the anodes of said first and second thyratrons 180 degrees out of phase with respect to each other, biasing means connected to the grids of said first and second thyratrons of said field voltage generating means for rendering said first and second thyratrons inoperative for a predetermined period of time before the field voltage is developed, trigger means connected to the grids of said first and second thyratrons of said armature voltage generating means for controlling the value of armature voltage generated, phase-shifting means connected to a grid of said first and second thyratrons of said field voltage generating means for controlling the value of field voltage generated, speed control means connected to said phase-shifting means and to said trigger means for energizing said trigger means to generate less than the rated value of armature voltage when the rated value of field voltage is being generated and for energizing said phase-shifting means when the rated value of armature voltage is being generated, sensing means connected between the output of said field voltage generating means and the output of said armature voltage generating means for opening a pair of contacts in the output of said armature voltage generating means whenever said field voltage falls below a predetermined minimum value, and sensing means connected between said armature voltage generating means and the grid of said second thyratrons of said field voltage generating means for biasing said grid below or substantially near the critical voltage for firing said second thyratrons whenever said armature voltage would be excessive for the magnitude of said field voltage developed.

No references cited.